United States Patent
Maeng (10) Patent No.: US 10,546,289 B1
(45) Date of Patent: Jan. 28, 2020

(54) MOBILE WALLETS WITH AUTOMATIC ELEMENT SELECTION

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 433 days.

(21) Appl. No.: 14/984,392

(22) Filed: Dec. 30, 2015

(51) Int. Cl.
*G06Q 20/32* (2012.01)
*G06Q 20/36* (2012.01)

(52) U.S. Cl.
CPC ......... *G06Q 20/36* (2013.01); *G06Q 20/3278* (2013.01)

(58) Field of Classification Search
CPC .... G06Q 20/20; G06Q 20/10; G06Q 20/3278; G06Q 20/12; G06Q 20/405; G06Q 20/36; G06Q 20/32; G06Q 20/00; G06Q 30/0255
USPC ........................................................... 705/40
See application file for complete search history.

(56) References Cited

U.S. PATENT DOCUMENTS

| | | |
|---|---|---|
| 911,721 A | 2/1909 | Harris |
| 5,375,251 A | 12/1994 | Pfundstein |
| 5,748,737 A | 5/1998 | Daggar |
| 5,943,624 A | 8/1999 | Fox |
| 6,588,660 B1 | 7/2003 | Buescher et al. |
| 6,944,447 B2 | 9/2005 | Portman et al. |
| 7,024,390 B1 | 4/2006 | Mori et al. |
| 7,113,925 B2 | 9/2006 | Waserstein et al. |
| 7,131,571 B2 | 11/2006 | Swift et al. |
| 7,360,692 B2 | 4/2008 | Zellner et al. |
| 7,438,236 B2 | 10/2008 | Top |
| 7,676,431 B2 | 3/2010 | O'Leary et al. |
| 7,702,587 B2 | 4/2010 | Nguyen et al. |

(Continued)

FOREIGN PATENT DOCUMENTS

| | | |
|---|---|---|
| CN | 104200365 A | 12/2014 |
| EP | 2887272 A1 | 6/2015 |

(Continued)

OTHER PUBLICATIONS

"Apple Pay", [Online]. Retrieved from the Internet: <URL: http://www.apple.com/apple-pay/, (Accessed Mar. 31, 2016), 8 pgs.

(Continued)

*Primary Examiner* — Hao Fu
(74) *Attorney, Agent, or Firm* — Schwegman Lundberg & Woessner, P.A.

(57) ABSTRACT

Methods and systems are disclosed for determining a wallet element for a transaction from among plurality of elements in a mobile wallet application operating on a mobile device. The mobile device, can for example, receive data from a contactless terminal that includes a transaction type such as a payment type or non-payment type transaction. Based on the transaction type and element-selection data such as configuration preferences, usage history or device-specific information, one or more mobile wallet element(s) from among the plurality of mobile wallet elements in the mobile wallet can be determined. The contactless terminal can then be sent wallet element data associated with the particular mobile wallet element.

17 Claims, 7 Drawing Sheets

(56) References Cited

U.S. PATENT DOCUMENTS

| | | | |
|---|---|---|---|
| 7,707,113 B1* | 4/2010 | DiMartino | G06Q 20/105 705/41 |
| 7,841,528 B2 | 11/2010 | Savry et al. | |
| 7,890,425 B2 | 2/2011 | Stanley | |
| 7,967,196 B1 | 6/2011 | Bierbaum et al. | |
| 8,019,365 B2 | 9/2011 | Fisher | |
| 8,095,113 B2 | 1/2012 | Kean et al. | |
| 8,108,261 B2 | 1/2012 | Carlier et al. | |
| 8,186,602 B2 | 5/2012 | Itay et al. | |
| 8,285,643 B2 | 10/2012 | Isaacson et al. | |
| 8,352,323 B2 | 1/2013 | Fisher | |
| 8,360,329 B2 | 1/2013 | Grigg et al. | |
| 8,374,963 B1 | 2/2013 | Billman | |
| 8,429,047 B2 | 4/2013 | Hurst | |
| 8,433,647 B1 | 4/2013 | Yarbough et al. | |
| 8,438,073 B2 | 5/2013 | White | |
| 8,463,674 B2 | 6/2013 | Hurst | |
| 8,511,543 B2 | 8/2013 | Yankovich | |
| 8,561,894 B1 | 10/2013 | Mullen et al. | |
| 8,565,723 B2 | 10/2013 | Cox | |
| 8,589,237 B2 | 11/2013 | Fisher | |
| 8,612,350 B2 | 12/2013 | Lee | |
| 8,639,629 B1 | 1/2014 | Hoffman | |
| 8,662,401 B2 | 3/2014 | Skowronek et al. | |
| 8,744,966 B1 | 6/2014 | Amacker | |
| 8,768,834 B2 | 7/2014 | Zacarias et al. | |
| 8,768,845 B1 | 7/2014 | Persson et al. | |
| 8,776,132 B2 | 7/2014 | Low et al. | |
| 8,788,333 B2 | 7/2014 | Alba et al. | |
| 8,788,418 B2 | 7/2014 | Spodak et al. | |
| 8,831,637 B2 | 9/2014 | Stopel et al. | |
| 8,880,886 B2 | 11/2014 | Kean et al. | |
| 8,972,286 B2 | 3/2015 | Grigg | |
| 8,977,569 B2 | 3/2015 | Rao | |
| 9,002,749 B1 | 4/2015 | Thiele | |
| 9,014,662 B1 | 4/2015 | Gailloux et al. | |
| 9,015,066 B2 | 4/2015 | Scipioni et al. | |
| 9,049,190 B2 | 6/2015 | Slaton et al. | |
| 9,092,776 B2 | 7/2015 | Dessert | |
| 9,123,036 B2 | 9/2015 | Graylin et al. | |
| 2002/0054513 A1 | 5/2002 | Kao | |
| 2002/0077993 A1 | 6/2002 | Immonen et al. | |
| 2002/0179704 A1 | 12/2002 | Deaton | |
| 2004/0127256 A1 | 7/2004 | Goldthwaite et al. | |
| 2005/0076369 A1 | 4/2005 | Cai et al. | |
| 2007/0125840 A1 | 6/2007 | Law et al. | |
| 2007/0130063 A1 | 6/2007 | Jindia et al. | |
| 2007/0265984 A1 | 11/2007 | Santhana | |
| 2007/0284871 A1 | 12/2007 | Gray | |
| 2008/0051059 A1 | 2/2008 | Fisher | |
| 2009/0064301 A1 | 3/2009 | Sachdeva et al. | |
| 2009/0271253 A1 | 10/2009 | Arazy et al. | |
| 2009/0288012 A1 | 11/2009 | Hertel et al. | |
| 2010/0057580 A1 | 3/2010 | Raghunathan | |
| 2010/0125495 A1 | 5/2010 | Smith et al. | |
| 2010/0125508 A1 | 5/2010 | Smith | |
| 2010/0125510 A1 | 5/2010 | Smith et al. | |
| 2010/0223110 A1 | 9/2010 | Slavin et al. | |
| 2010/0318415 A1 | 12/2010 | Gottlieb | |
| 2011/0218907 A1 | 9/2011 | Dessert | |
| 2011/0258119 A1 | 10/2011 | Al | |
| 2011/0295705 A1 | 12/2011 | Kasmei | |
| 2011/0295744 A1 | 12/2011 | Wisniewski et al. | |
| 2012/0023024 A1 | 1/2012 | Evans | |
| 2012/0089425 A1 | 4/2012 | Borucki | |
| 2012/0143752 A1 | 6/2012 | Wong et al. | |
| 2012/0166333 A1 | 6/2012 | von Behren et al. | |
| 2012/0197787 A1 | 8/2012 | Grigg | |
| 2012/0197794 A1 | 8/2012 | Grigg et al. | |
| 2012/0253852 A1 | 10/2012 | Pourfallah | |
| 2013/0013499 A1 | 1/2013 | Kalgi | |
| 2013/0097041 A1 | 4/2013 | Fisher | |
| 2013/0103478 A1 | 4/2013 | Fisher | |
| 2013/0103511 A1 | 4/2013 | Fisher | |
| 2013/0103512 A1 | 4/2013 | Fisher | |
| 2013/0103513 A1 | 4/2013 | Fisher | |
| 2013/0103514 A1 | 4/2013 | Fisher | |
| 2013/0110658 A1 | 5/2013 | Lyman | |
| 2013/0151360 A1 | 6/2013 | Scipioni et al. | |
| 2013/0191279 A1 | 7/2013 | Calman et al. | |
| 2013/0204785 A1 | 8/2013 | Monk | |
| 2013/0260734 A1 | 10/2013 | Jain et al. | |
| 2013/0275302 A1 | 10/2013 | Lee et al. | |
| 2013/0282590 A1 | 10/2013 | Rajarethnam | |
| 2013/0311363 A1 | 11/2013 | Ramaci | |
| 2013/0332337 A1 | 12/2013 | Tran | |
| 2014/0006276 A1 | 1/2014 | Grigg et al. | |
| 2014/0040126 A1 | 2/2014 | Andrews et al. | |
| 2014/0058937 A1 | 2/2014 | Watson | |
| 2014/0089120 A1 | 3/2014 | Desai et al. | |
| 2014/0129357 A1* | 5/2014 | Goodwin | G06Q 30/02 705/16 |
| 2014/0129435 A1 | 5/2014 | Pardo et al. | |
| 2014/0129438 A1 | 5/2014 | Desai et al. | |
| 2014/0136349 A1 | 5/2014 | Dave | |
| 2014/0188720 A1 | 7/2014 | Aiglstorfer et al. | |
| 2014/0195422 A1 | 7/2014 | Zheng et al. | |
| 2014/0279106 A1 | 9/2014 | Smelcer | |
| 2014/0279403 A1 | 9/2014 | Baird et al. | |
| 2014/0291392 A1 | 10/2014 | Teuwen et al. | |
| 2014/0291406 A1 | 10/2014 | Ko | |
| 2014/0297517 A1 | 10/2014 | Gnanasekaran | |
| 2014/0344153 A1 | 11/2014 | Raj et al. | |
| 2015/0019427 A1 | 1/2015 | Murphy et al. | |
| 2015/0019567 A1* | 1/2015 | Li | G06F 3/0482 707/748 |
| 2015/0045068 A1 | 2/2015 | Soffer | |
| 2015/0186872 A1 | 7/2015 | Sobol et al. | |
| 2015/0235256 A1 | 8/2015 | Barsoum et al. | |
| 2015/0348007 A1 | 12/2015 | Khan et al. | |
| 2016/0358199 A1* | 12/2016 | Van Os | G06Q 20/40 |

FOREIGN PATENT DOCUMENTS

| | | |
|---|---|---|
| WO | WO-2007046785 A1 | 4/2007 |
| WO | WO-2011072969 A1 | 6/2011 |
| WO | WO-2012083113 A3 | 6/2012 |
| WO | WO-2014084484 A1 | 6/2014 |
| WO | WO-2014122453 A2 | 8/2014 |

OTHER PUBLICATIONS

"Card1 Debuts Universal Card Technology Connecting Conventional Payment Card to Digital Wallet Platform", BusinessWire, (Sep. 21, 2015), 2 pgs.

"Contactless Mobile Payment Application Activation User Interface Overview, Usage Guidelines, and PPSE Requirements,", EMVCo, Version 1.0, (Dec. 2010), 120 pgs.

"Electronic Check Processing", Chase, [Online]. Retrieved from the Internet: <URL: https://www.chasepaymentech.com/electronic_check_processing.html, (Accessed Nov. 30, 2015), 1 pg.

"MyECheck debuts check-based mobile wallet", The Green Sheet Online Edition, (Sep. 28, 2015), 3 pgs.

"Stored-value card", [Online]. Retrieved from the Internet: <URL: https://en.wikipedia.org/wiki/Stored-value_card, (Accessed Mar. 31, 2016), 4 pgs.

"Visa Contactless—EMV Transaction Flow Chart", [Online]. Retrieved from the Internet: <URL: https://www.level2kernel.com/visa-contactless-emv-transaction-flow-chart.html, (Accessed Mar. 31, 2016), 3 pgs.

"Wallet-POS Specification", GSM Association, Version 1.0, (May 2013), 32 pgs.

Balan, Rajesh, et al., "The Digital Wallet: Opportunities and Prototypes", Invisible Computing IEEE Computer Society, (2009), 100-102.

Egan, Matt, "What is NFC? How does NFC work? What is NFC for? Does my phone have NFC? Uses of NFC | A guide to NFC, and how to use NFC on your smartphone to do useful things", [Online]. Retrieved from the Internet: <URL: http://www.pcadvisor.co.uk/

(56) References Cited

OTHER PUBLICATIONS how-to/mobile-phone/what-is-nfc-how-nfc-works-what-it-does-3472879/, (May 12, 2015), 5 pgs.

Fundinger, Danny, "Using a mobile wallet: A day in the life", [Online]. Retrieved from the Internet: <URL: http://asmarterplanet.com/mobile-enterprise/blog/2015/02/mobile-wallet-uses.html, (Feb. 23, 2015), 6 pgs.

Geuss, Megan, "How Apple Pay and Google Wallet actually work", [Online]. Retrieved from the Internet: <URL: http://arstechnica.com/gadgets/2014/10/how-mobile-payments-really-work/1/, (Oct. 29, 2014), 5 pgs.

Geuss, Megan, "Why Apple Pay could succeed where others have had underwhelming results", [Online]. Retrieved from the Internet: <URL: http://arstechnica.com/apple/2014/09/why-apple-pay-could-succeed-where-others-have-had-underwhelming-results/, (Sep. 14, 2014), 6 pgs.

Kadambi, Kiran S., et al., "Near-Field Communication-Based Secure Mobile Payment Service", Proceedings of the 11th international Conference on Electronic Commerce, ACM, (2009), 142-151.

Kar, Ian, "Here's How the Security Behind Apple Pay Will Really Work", [Online]. Retrieved from the Internet: <URL: http://bankinnovation.net/2014/09/heres-how-the-security-behind-apple-pay-will-really-work/, (Sep. 12, 2014), 5 pgs.

Pourghomi, Pardis, et al., "A Secure Cloud-Based Nfc Mobile Payment Protocol", vol. 5, (Nov. 2014), 8 pgs.

Shanbhag, Raju, "Paydiant's Cloud Mobile Wallet Receives appSecure Certification", [Online]. Retrieved from the Internet: <URL: http://it.tmcnet.com/topics/it/articles/2012/06/27/296557-paydiant-cloud-mobile-wallet-receives-appsecure-certification.htm, (Jun. 27, 2012), 2 pgs.

Wolpin, Stewart, "Mobile Wallets: Apple Pay vs Samsung Pay vs Android Pay", [Online]. Retrieved from the Internet: <URL: http://www.tomsguide.com/us/mobile-wallet-guide,news-20666.html, (Oct. 19, 2015), 19 pgs.

\* cited by examiner

MOBILE WALLETS WITH AUTOMATIC ELEMENT SELECTION

TECHNICAL FIELD

Embodiments described herein generally relate to mobile wallets and, for example and without limitation, mobile wallets that can automatically select elements for users.

BACKGROUND

Mobile wallets can allow consumers to make contactless payments for products and services with mobile devices such as phones or watches instead of cash, credit cards or checks. Using an antenna in the mobile device, mobile wallets can communicate with contactless readers using radio frequency identification (RFID) such as near field communication (NFC). They can allow consumers to make secure payments in a relatively quick manner by placing their mobile devices near contactless readers at stores. Mobile wallets can also be used to make purchases within applications on mobile devices and over the internet.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

The present disclosure provides various ways for a mobile or digital wallet to automatically select element(s) for a user based on the context in which the wallet is used. For example, a mobile wallet can automatically select wallet elements for a transaction based on a transaction type (e.g., payment or non-payment), user preferences or usage history, and wallet location. This can include predicting the wallet elements a user may desire at a particular store and displaying those elements having the highest likelihood of being desired. In this way, the present disclosure makes access to wallet elements more convenient for the user, especially as the number of wallet elements held in a mobile wallet expands.

Figure 1:
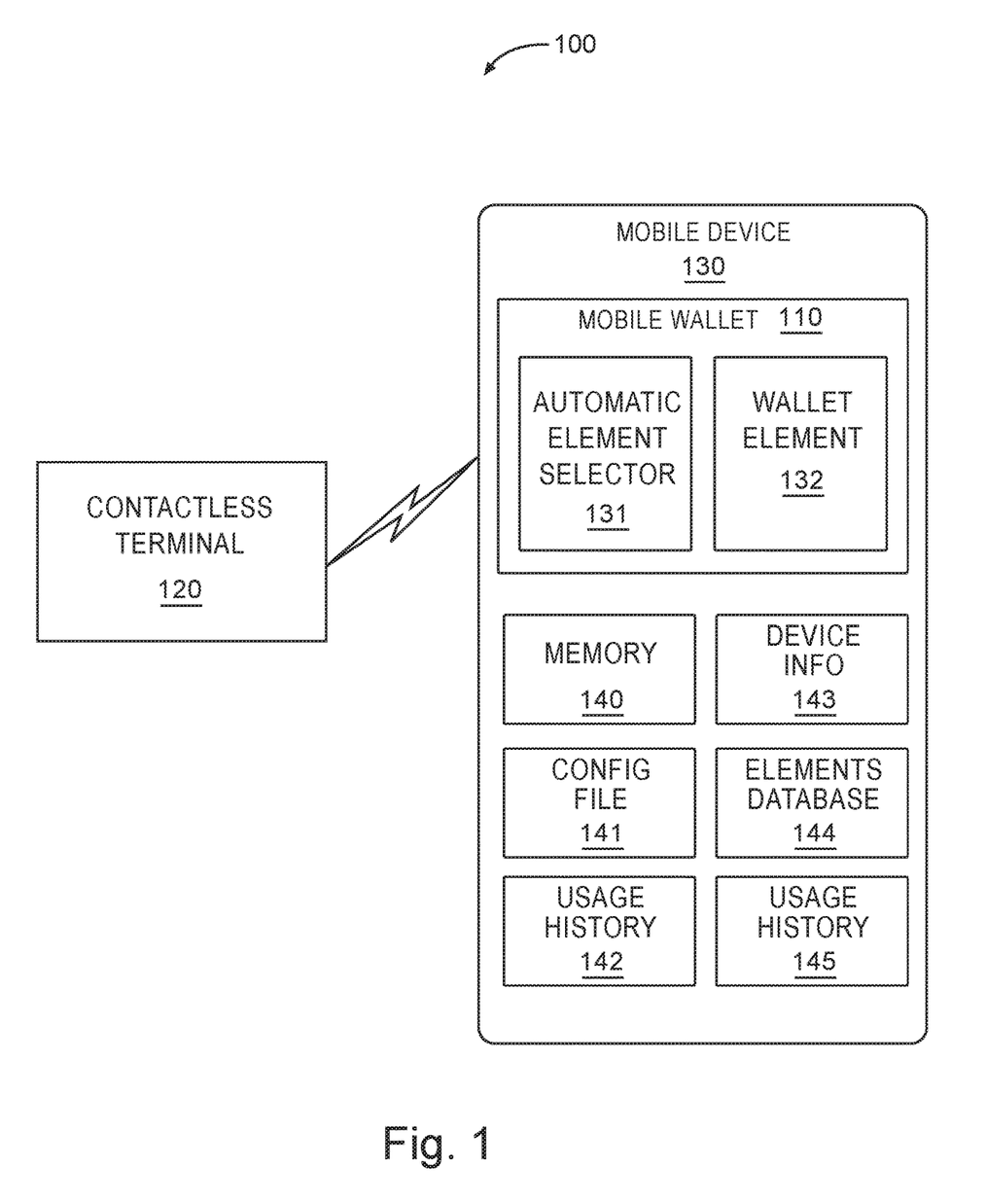
FIG. 1. illustrates a schematic diagram of a mobile wallet environment, according to various examples.

FIG. 1 illustrates an example system 100 for mobile wallet transactions. The example system includes a mobile wallet application 110 (sometimes, simply referred to as a mobile wallet) operating on a mobile device 130 such as a smart phone, tablet or smart watch. The mobile wallet 110 can include one or more wallet elements 132 representing credit cards, debit cards, reward cards, identification cards, tickets, boarding passes, etc. The wallet elements 132 can, for example, be classified into payment service and non-payment service elements. Examples of payment service wallet elements include credit cards, debit cards, tickets, and subway passes. Examples of non-payment service wallet elements include employee cards, insurance cards, membership cards, and driver's licenses.

For each wallet item or element 132, the mobile device 130 stores unique account information (e.g., an elements database 144). For a credit card, for example, the unique account information can be a device-specific device account number (DAN) and a key typically provided by a card network or a card-issuing bank. In another example, the unique account information for a credit card can be the credit card number and the account holder's name.

The mobile wallet 110 includes an automatic element selector module 131 that can, for example, receive transaction type data from a contactless terminal 120 (e.g., a point of sale (POS) device) associated with a merchant and automatically determine one or more wallet elements that can be provided to the contactless terminal 120 based on element-selection data (e.g., user preference data, usage history data, and mobile device data such as location and time) and the transaction type. The element selector module can, for example, be part of the mobile wallet 110 or can be a separate module with which the mobile wallet 110 interfaces, located on the mobile device 130 or external to the mobile device 130.

A transaction type can, for example, be a type of wallet element such as payment or non-payment type that is required for the transaction. Example payment types include credit cards, debit cards, and gift cards. Example non-payment types include event or concert tickets, subway passes, identification cards, etc. A transaction type can also be a type or name of goods or services being purchased and/or type, name or an identifier of the merchant. The mobile wallet 110 can, in some examples, send transaction authorization data (e.g. the DAN and a key), associated with the particular mobile wallet element determined by element selector 131, to the contactless terminal 120 in order to make a payment or make a transaction with the particular wallet item(s) determined using the element selector.

The example mobile device 130 can, for example, include a user interface (e.g., touch screen) for receiving user input and displaying content to the user, an antenna for wirelessly communicating with the contactless terminal 120 (using near field communication (NFC) for example), and a processor for controlling operation of the mobile device 130. The mobile device 130 can further include a storage device such as memory 140 and a security code generator (not shown). The security code generator can, for example, dynamically generate transaction authorization data (e.g., dynamic security codes) for making a transaction.

The example mobile device 130 can, for example, include a memory 140, a configuration file 141, usage history file 142, device-specific information 143 and a wallet element database 144, and one or more secure elements 145. The components 141-145 can be stored on the memory 140 or in other storage devices on the mobile device 130. In another example, one or more or all of the memory 140 or components 141-145 can be stored remotely (e.g., on an external server) and the element selector module 131 can communicate with other applications to obtain information from the components to select wallet elements and present them to the user for selection and presentation to a POS device or directly to the POS device without further user interaction.

The preferences configuration file 141 (e.g., a table) can contain the preferences of the user with regard to the wallet elements 132. For example, the configuration file 141 can contain a list of wallet elements to use in a priority order, generally. In another example, the configuration file can contain a prioritized list of wallet elements based on transaction type, based on device location and/or other criteria. For example, for a payment transaction type, the user can set a preferential order of credit or debit card wallet elements to use. The element selector module 131 can, for example, receive user input specifying particular elements for particular transaction types and store this information in the configuration file 141. For instance, the user can specify a particular credit card for purchasing gas since the card provides higher refund than others.

The usage history file 142 (e.g., table) can contain a history of transactions including transaction information (e.g., transaction type data, location, merchant, and/or goods or services purchased) and the wallet element 132 used for each transaction. The usage history file 142 can, for example, keep track of a user's behavior in submitting wallet elements, storing for a transaction the wallet element(s) used and the transaction type for the transaction. As time goes by, the usage history file 142 can store more information about the user's behavior and the element selector module 131 can learn to make better decisions.

The memory 140 can also store device-specific information 143 such as GPS data, calendar data, time and date data, cellular network data and Wi-Fi network data and other information specific to the device. Location information such as GPS data or network data can be used by the element selector module 131 to identify wallet elements 132 appropriate for the identified location for instance.

The memory 140 can also store an elements database 144. The elements database 144 can store information on each wallet element and can be accessed by the element selector module 131 to determine what wallet element(s) can be selected based on a transaction type. For example, the element database can store an element type (e.g., payment or non-payment type) for each wallet element 132. In one example, a payment type can be associated with a credit card and a non-payment type can be associated with a student ID. The element selector module 131 can, for example, not present a student ID card for purchasing products at a grocery store since the element type for the student ID card (e.g., non-payment type) would not match with the transaction type (e.g., payment type) for the grocery store, for example.

The element selector module 131 can, for example, use the transaction type and the configuration file, the usage history file and the device-specific information to determine which wallet element(s) to use or present to the user for the transaction. The element selector module 131 can in some examples perform other functions such as enabling or disabling automatic wallet element selection and alerting users to promotional offers for using particular wallet element payment cards for a presented transaction type.

In addition, while the above example illustrates an element selector module 131, configuration file 141, usage history file 142, device information file 143 and elements database 144 residing on the mobile device 110, one or more or all of these elements can reside and operate on an external system (e.g., a computing device at the wallet service provider) and the mobile device 110 can interface with the external system which can perform the methods described herein.

To make a payment at merchant associated with the contactless terminal 120, for example, a user can place the mobile device 130 near the contactless terminal 120 (e.g., by tapping it with the mobile device 130 or waving the mobile device 130 in front of the terminal 120). The user can also be requested by the mobile device 130 to authenticate the payment request by biometric authentication (e.g., providing a fingerprint) or entering a pin number or code. The mobile device 130 can then wirelessly transfer unique account information (e.g., a DAN and key) for a credit card wallet element 132 to the contactless terminal 120 using near field communication (NFC).

The mobile device can also generate and send to contactless terminal 120 a dynamic security code that is transaction specific. The contactless terminal 120 can send a merchant identification number, the unique account information and transaction-specific dynamic security code, and the transaction amount to a processing network (e.g., card network and issuing banks) to authorize payment.

The illustrated system 100 can further be connected to a network (not shown) connecting the contactless terminal 120 and the mobile device 130 with external systems such a bank network, card issuing banks and/or a mobile wallet service provider. The network can include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network can include a single local area network (LAN) or wide-area network (WAN), or combinations of LAN's or WAN's, such as the Internet.

Figure 2:
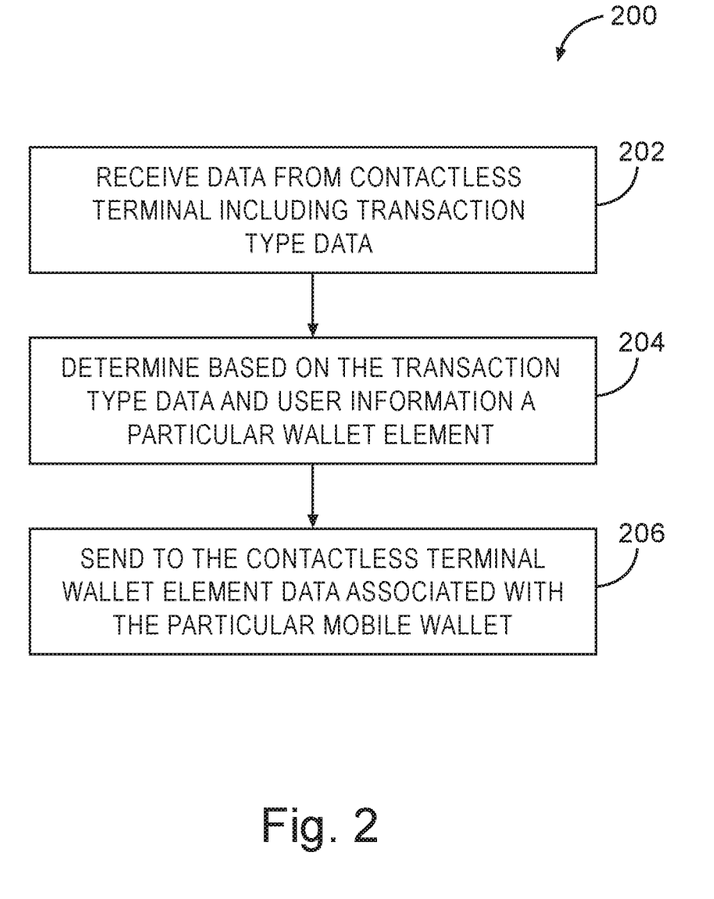
FIG. 2 illustrates a flowchart of a method for determining and presenting wallet element(s) to a contactless terminal, according to various examples.

FIG. 2 illustrates an example method 200 for determining a wallet element for a transaction from among a plurality of elements in a mobile wallet application operating on a mobile device. While the method 200 is described with references to an element selector module operating on a mobile device, the method can also be performed using an element selector module operating on an external computing device that communicates with the mobile device or an element selector module that has functionality distributed in part on a mobile device and in part on an external computing device.

At 202, an element selector module operating on the mobile device can receive data from a contactless terminal that includes a transaction type. The data, for example, can be passed from the contactless terminal to the mobile device wirelessly (e.g., using NFC) upon presenting the mobile device to the terminal. The transaction type can specify one or more of the wallet element types required by the merchant to process the transaction. Wallet element types can, for example, be classified into two types such as a payment type (e.g., credit cards, debit cards, event tickets, subway passes etc.) and non-payment type (e.g., identification cards, driver's licenses, insurance cards, membership cards, etc.). In other examples, wallet element types can be classified into more than two types with a type associated with a credit card, debit card, insurance card, event ticket, subway pass, etc. In other examples, the transaction type data can be received wirelessly from a network associated with the merchant. For example, upon entering a merchant's store, the mobile device can connect with the merchant's local area network and obtain the transaction type data.

In some examples, in addition to or in lieu of receiving a payment type or non-payment type, the element selector module can also receive or determine a transaction type such as, for example, a category of good or services (e.g., groceries, gas, household goods, etc.) or names of merchants (e.g., Target®, COSTCO®, Whole Foods Market®, etc.) from the data received from the contactless terminal. The element selector module can determine the transaction type from merchant and/or product information received from the contactless terminal or received from the merchant over the merchant's Wi-Fi network, for example, or can cross-reference the GPS location of the mobile device with a list of merchants to determine the name of the merchant. For example, the element selector module can receive the name or identifier of a merchant and query a database associating the name or identifier with one or more categories of goods or services. The database can be stored on the mobile device or be stored remotely and accessed by the element selector module wirelessly. In another example, the element selector module can parse the merchant or product information and determine the name of the merchant or the category of goods or services.

At 204, the element selector module can determine one or more particular mobile wallet elements from among a plurality of mobile wallet elements in the mobile wallet based on element-selection data and the transaction type. The element-selection data can, for example, include one or more of user preference data, usage history data and/or device-specific data such as location and time. Using the transaction type and element-selection data, the element selector can automatically determine one or more particular mobile wallet elements for the transaction or can determine one or more particular elements by presenting a plurality of available wallet items and receiving a selection of one or more particular elements from the user.

At 206, the element selector module can send to the contactless terminal the information contained in the selected wallet element(s). For example, if the element selector automatically selects or receives a user selection of a credit card, the mobile device or element selector module can send transaction authorization data (e.g., DAN and a key) associated with the credit card wallet element. In an automatic example where a credit card element is determined, the element selector module can send the transaction authorization data automatically after determining the particular credit card wallet element and without receiving a user selection of the wallet element from his or her wallet.

In one example, the element selector module can determine, based on element-selection data and the transaction type, available mobile wallet elements from among a plurality of mobile wallet elements in the mobile wallet and display the available mobile wallet elements on a user interface of the mobile device. The element selector module can then, for example, receive a selection of the particular mobile wallet element(s) from the available mobile wallet elements from a user. In another example, the element selector module can determine the particular wallet element for a transaction automatically without receiving a user selection of the particular wallet element. The element selector module can present a confirmation of the automatically selected wallet element before a payment is processed.

Figure 3A:
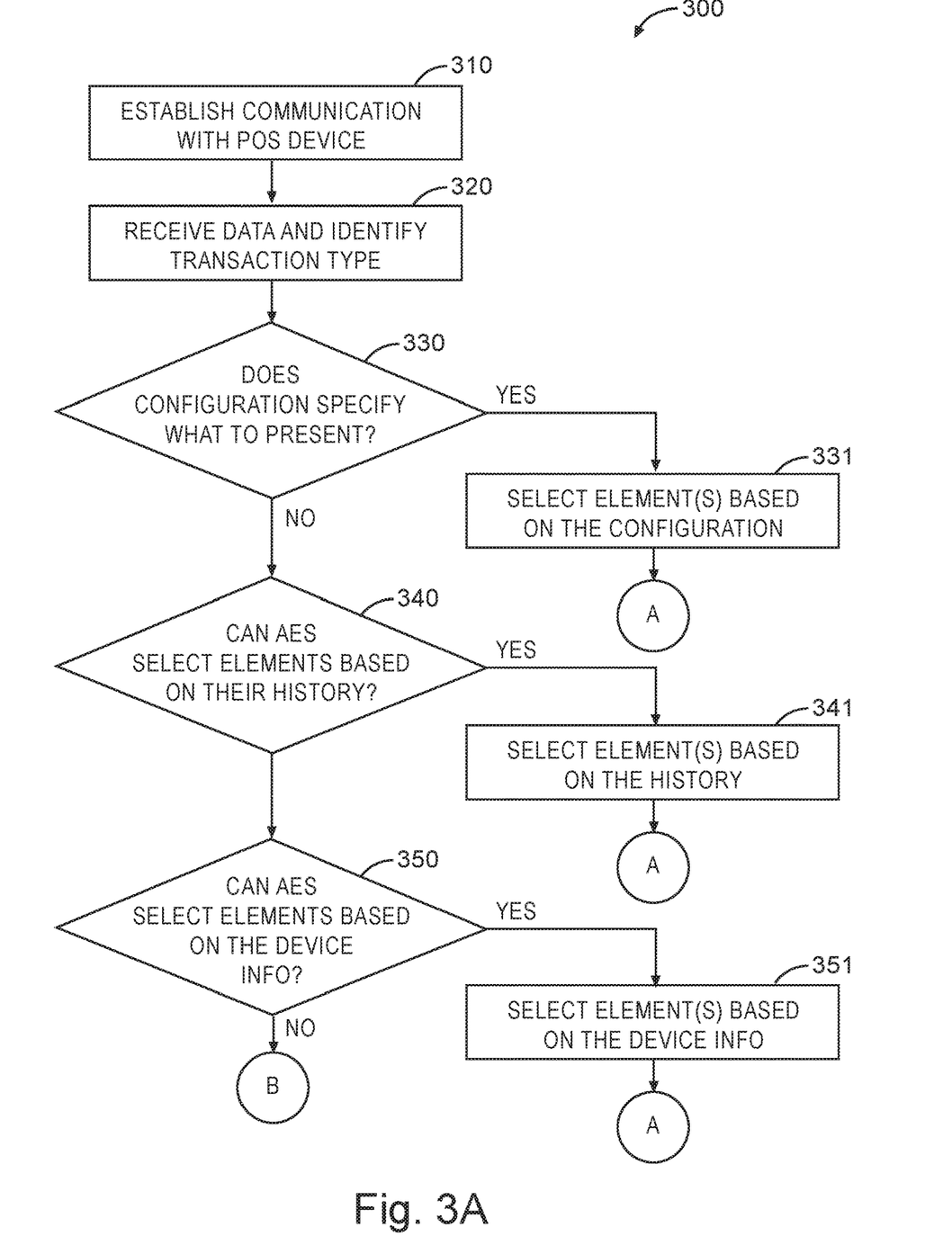
FIGS. 3A and 3B illustrates a flowchart of a method for determining and presenting wallet element(s) to a contactless terminal, according to various examples.
Figure 3B:
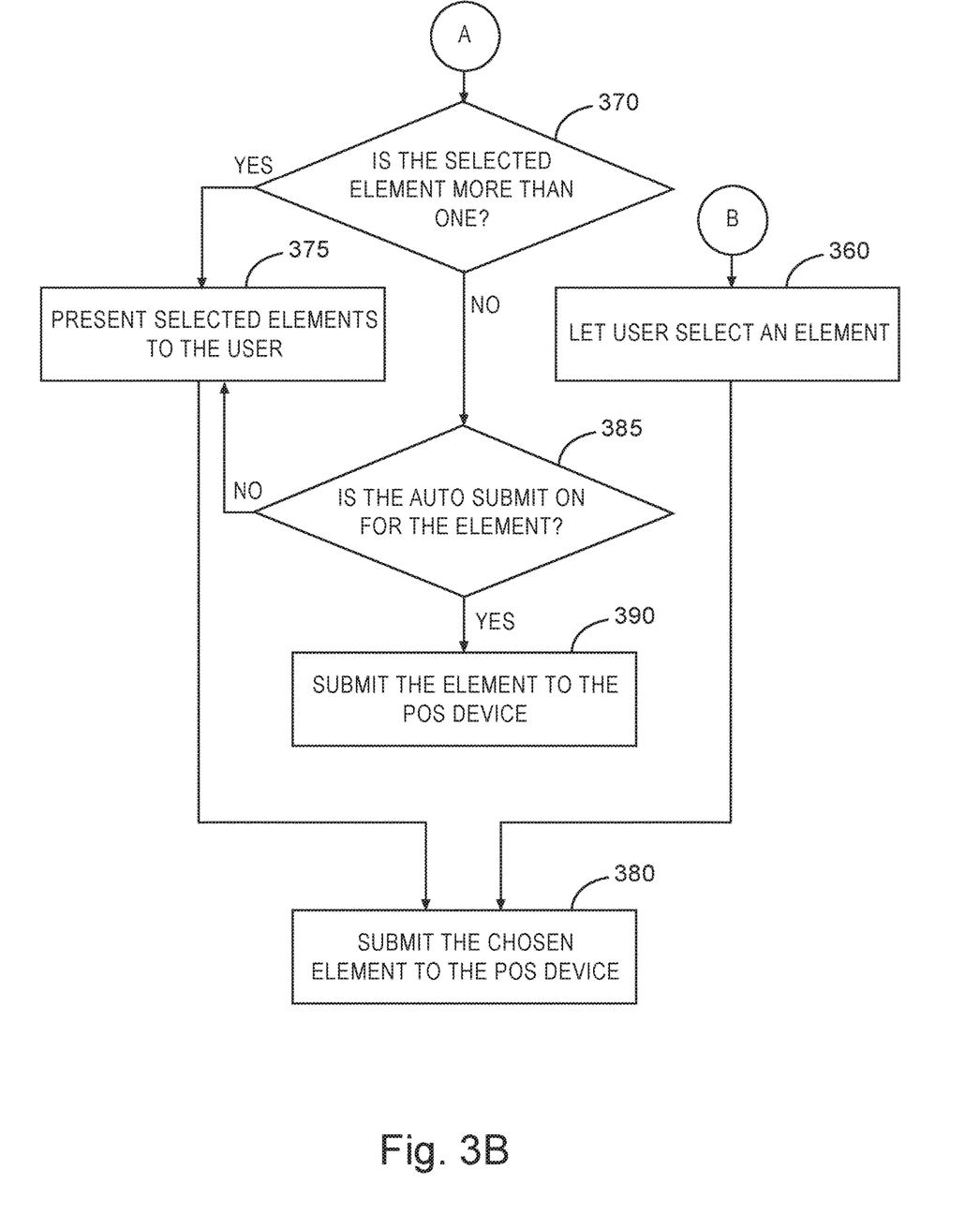

FIGS. 3A and 3B illustrate an example method 300 for automatically determining wallet element(s) for a transaction from among plurality of elements. At 310, a mobile wallet can establish communication with a contactless terminal using NFC or other wireless techniques. The communication between the wallet and the contactless terminal can, for example, be based on the EMV specifications and/or ISO standards such as ISO 14443 and 18092. At 320, an element selector module (e.g., in the mobile wallet) can receive data from the contactless terminal that indicates or can be used to determine the transaction type for the transaction. The transaction type can for example be data specifying whether a non-payment type or payment type wallet element is necessary for the transaction and/or can be data specifying or used to determine a category of goods or merchant type.

At 330, the element selector module can check a configuration file and determine whether one or more wallet elements are specified in the configuration file for the transaction type. If the configuration specifies any particular element(s), the element selector module can select the element(s) as indicated at block 331. Control can then flow along path A of FIG. 3B. For instance, if the element selector module determines the transaction type is making a payment to a gas station, and the configuration file indicates that the user has configured to use specific credit card(s) for paying for gas, the element selector module can select the specified card(s).

At block 340, if the configuration file does not specify particular wallet elements for a transaction type, the element selector module can check the usage history and determine if the element selector module can select one or more wallet elements based the usage history. If the usage history specifies any particular element(s), the element selector module can select the element(s) as indicated at block 341. Control can then flow along path A of FIG. 3B. The usage history can be a set of previous transaction data that associates each transaction with a transaction type and one or more wallet elements. For instance, if the user often (e.g., greater than predefined percentage of the time) used one or more particular credit cards for purchasing gas, the element selector module can select those credit card(s) to present to the user or the contactless terminal at block 341. The element selector module can select wallet elements using selection criteria such as by determining a confidence level for a wallet element for a particular transaction type and selecting those wallet element(s) that have a confidence level exceeding a threshold level.

At block 350, if the usage history does not specify particular wallet elements for a transaction type, the element selector module can check device-specific information to determine one or more wallet elements to select. Exemplary device-specific information can be stored on the mobile device on which the mobile wallet operates and can include GPS location information, cellular network information, calendar items, and time and date. For example, the element selector module can determine that the mobile device is in a particular geographic location based on GPS data or cellular service data and can select wallet element(s) accepted in the geographic location. For instance, if the mobile wallet user enters subway gate in New York City, the element selector module can select a New York City subway pass (e.g., MetroCard in the mobile wallet) based on the location of the mobile device. If the device-specific information specifies any particular element(s), the element selector module can select the element(s) as indicated at block 351. Control can then flow along path A of FIG. 3B If the element selector module does not automatically select one or more wallet elements based on user preferences, usage history and/or device-specific information at blocks 330, 340, or 350, control can flow along path B to block 360 (FIG. 3B). At block 360, the user can navigate through his or her mobile wallet in conventional ways to one or more wallet elements to present to the contactless terminal. Returning to path A, at 370, the element selector module can determine if more than one wallet element was determined based on user preferences, usage history and/or device-specific information (e.g., from selection at blocks 330, 340 or 350). If the element selector module determines more than one wallet element, the element selector module can present the selected items to the user on the mobile device at block 375. The element selector module can receive the user's selection of one or more of the presented elements and then the element selector module, at block 380, can submit the chosen wallet element(s) to the contactless terminal.

If, at block 370, the element selector module determines only one wallet based on user preferences, usage history and/or device-specific information, then at block 385, the element selector module can check if an auto submission for the selected element is ON. The auto submission status for a wallet element can, for example, be set to ON or OFF by the user with the setting stored in a configuration file. The element selector can, for example, query the configuration file or elements database to determine if the selected element can be automatically submitted to a contactless terminal. If the element selector module determines that auto submission is ON for the selected element, the element selector module can submit the element to the contactless terminal automatically without presenting it to the user or requiring user input (block 390). For example, when a mobile wallet user enters a subway station associated with a certain subway pass and the auto submission for a subway pass wallet element is ON, the element selector module can automatically submit the subway pass to the contactless terminal at the subway entrance without presenting it to the user or requiring user input. If auto submission is OFF, then the element selector can present the wallet element to the user at block 375.

Figure 4:
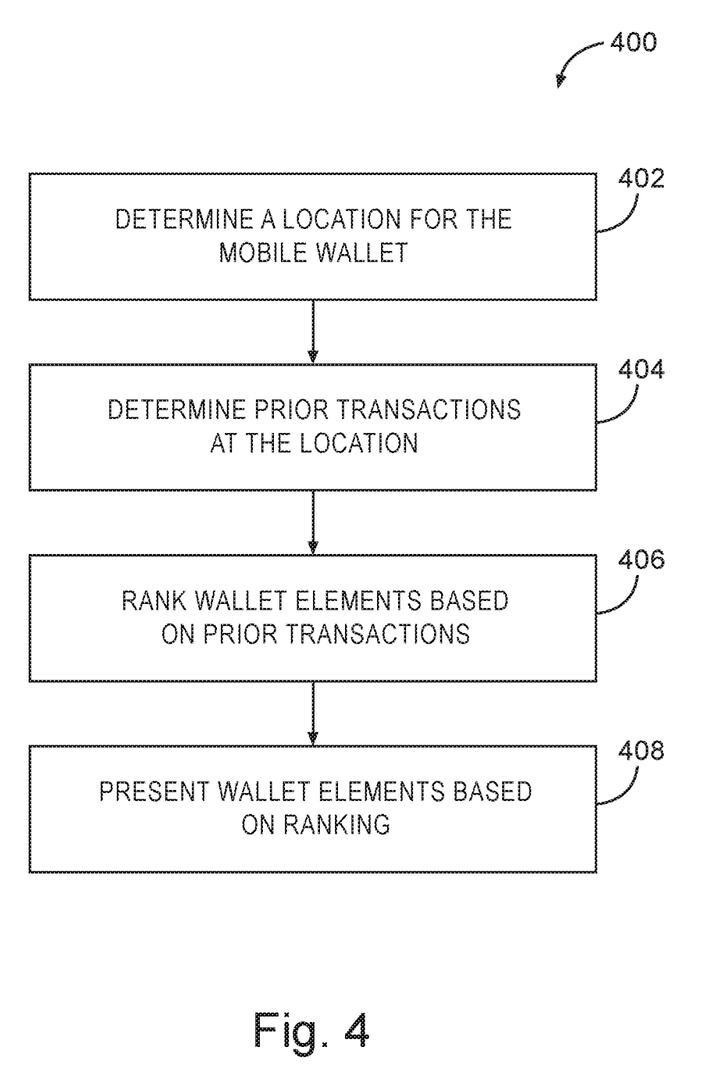
FIG. 4 illustrates an example method of using an element selector associated with a mobile wallet on a mobile device to predict and present elements to a user, according to various examples.

FIG. 4 illustrates an example method 400 of using an element selector associated with a mobile wallet on a mobile device to predict and present elements to a user, according to an example. At block 402, the element selector determines a location for the mobile wallet. This operation can be carried out in the background or initiated when the user opens his or her wallet. The location can be determined from GPS data from the mobile device's GPS system or from location data received by the mobile device over a network such as a Wi-Fi or cellular network. The location can also be data identifying a store. For example, a beacon or access point of the store can broadcast the store's name or an identifier, which can be used as a lookup for the store's location. The data from the POS device may include the location information or the mobile wallet may obtain the location information based on the store information.

At block 404, the element selector determines a set of prior transactions by the mobile wallet at the location. The element selector can, for example, query a usage history file to determine prior transactions at the location. The usage history file can be stored on memory on the mobile device or can be stored remotely (e.g., on a server).

At block 406, the element selector can rank one or more wallet elements for a transaction at the location. The ranking can be based on a prediction value, for each wallet element, indicating the likelihood of the user wanting to use a particular wallet element for the transaction. The ranking and prediction values can be based on the frequency of use of a wallet element for the location, for example. The prediction value can also be based on time (e.g., hour, day or week). The element selector can determine the time for a transaction and query the usage history file to determine prior transactions for the time. Wallet elements used most often at or near the time can receive a higher prediction value, indicating a higher likelihood of a user desiring to use the wallet element for the transaction.

At block 408, based on the ranking, the element selector can present a subset of the wallet elements to the user for the transaction at the location. The subset of the wallet elements can include some or all of the wallet elements, and the wallet elements can be presented in a priority order based on the ranking (e.g. predictive values). Those having a higher predictive value can be presented to a user for selection first, for example.

In some examples, the element selector can determine a first set of wallet elements for a transaction using a predictive value based on location. If the number of wallet elements is large (e.g., over a defined threshold amount), the element selector can determine a smaller number of wallet elements using time as an additional factor. In some examples, a ranking is based on weighted data input. For example, time can be weighted so that wallet elements used in more recent prior transactions receive a higher weight than wallet elements used in older transactions.

Figure 5:
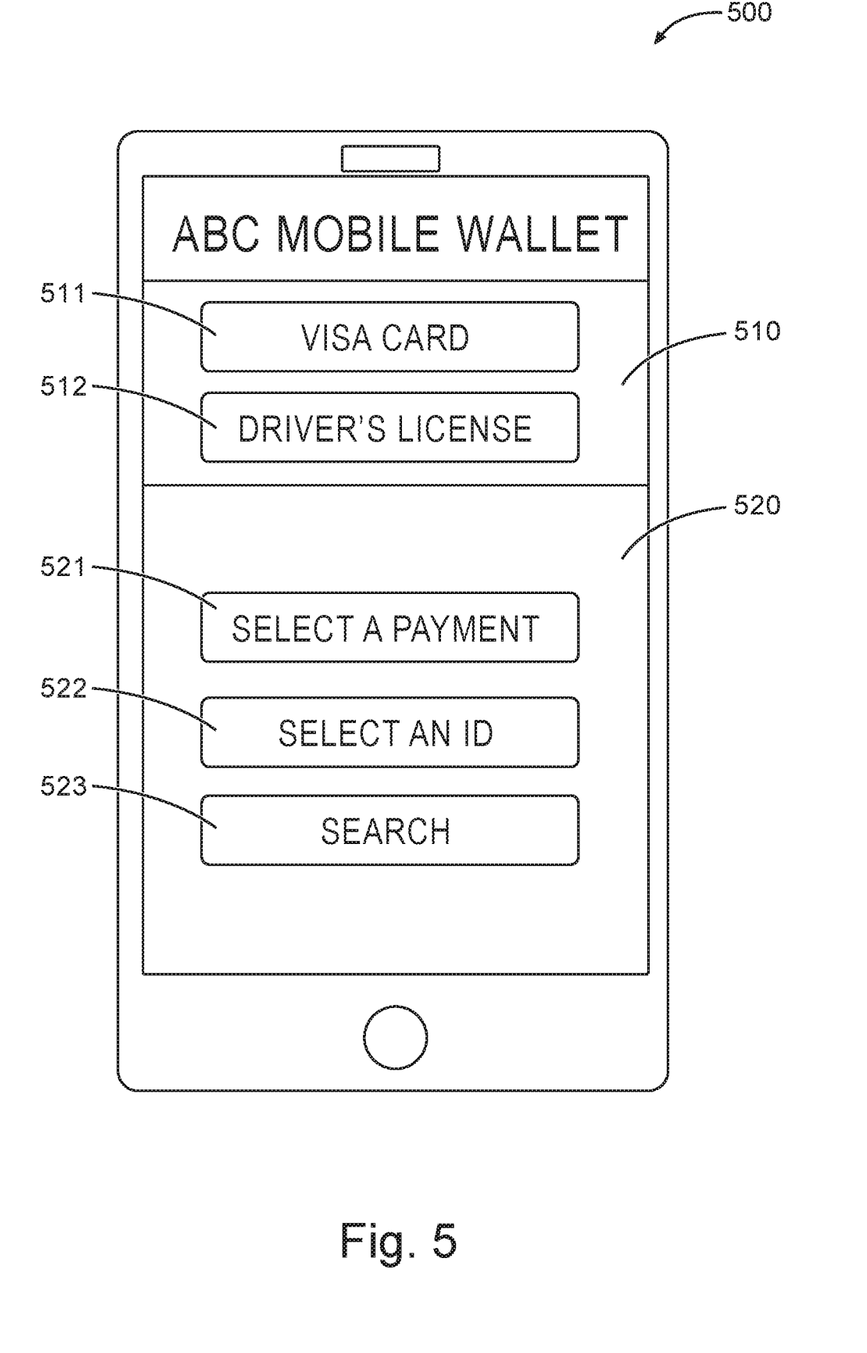
FIG. 5 illustrates a mobile wallet presenting wallet elements based on ranking, according to various examples.

FIG. 5 illustrates a mobile wallet presenting wallet elements based on ranking, according to an example. The mobile wallet 500 includes two user interface portions 510 and 520. The first portion 520 displays the mobile wallet elements identified by an element selector and the second portion 520 displays input user interface elements of a regular wallet. The first portion 510 includes one or more wallet elements selected by the element selector based on predictive values for the wallet elements. In the example, the element selector presents a Visa card 511 and a driver's license 512 to the user to use for a transaction at a store. The element selector can determine the Visa card 511 and driver's license 512 by querying a usage history file, determining those transactions at the store, and determining the Visa card 511 and driver's license 512 have the highest predictive value at the store. The user can use the Visa card 51 to make a payment and can provide the driver's license 512 as identification at the store. If the user wants to use a different payment means or ID for the transaction, he or she can select a different payment card (e.g., credit card) using input 521 or choose a different ID at input 522. The user can also conduct a search using input 523 if a different type of element is desired, for example. The mobile wallet upon activation of an input 521-523 can open a menu to select additional items. The user interface of the mobile wallet 500 can be configured a number of different ways and the disclosure is not limited to the particular configuration shown in FIG. 5.

Figure 6:
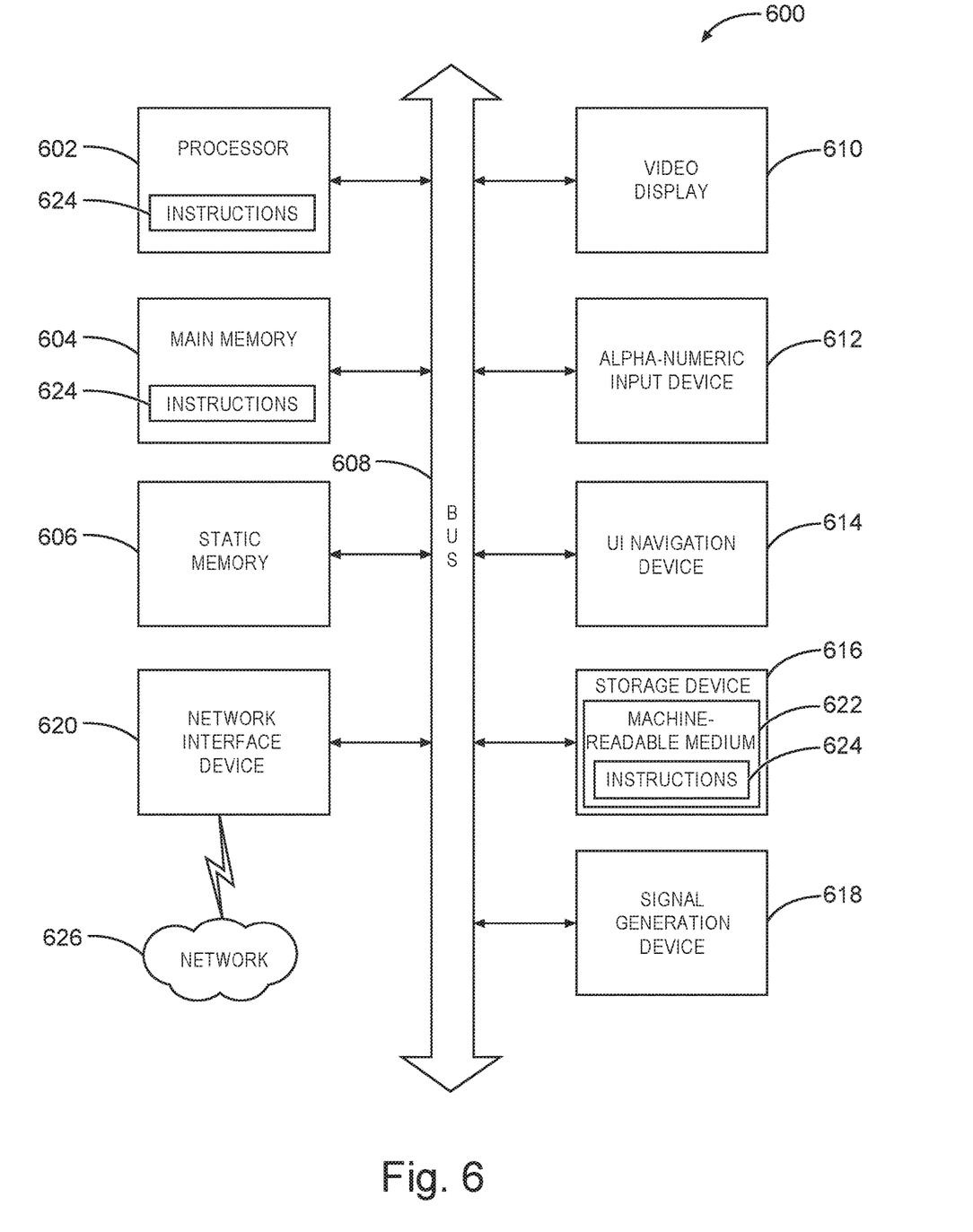
FIG. 6 is a block diagram of a machine in the example form of a computer system within which a set of instructions, for causing the machine to perform any one or more of the methodologies discussed herein, may be executed.

FIG. 6 is a block diagram illustrating a machine in the example form of a computer system 600, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 can further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 can additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 can also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" can include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 can further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method of using a mobile wallet operating on a mobile device, the method comprising:
    establishing communication between the mobile wallet and a contactless terminal;
    receiving data from the contactless terminal specifying a transaction type, the transaction type indicating a type of wallet mobile element required to process a transaction;
    determining, based on element-selection data and the transaction type, a particular mobile wallet element from among a plurality of mobile wallet elements in the mobile wallet, the element selection data including a configuration file designating certain wallet elements to be used with certain transaction types, a usage history including data associating certain wallet elements with prior transaction types, and device specific-information and wherein the determining includes in order of priority, determining that, the configuration file does not specify any particular wallet element for the transaction type, and in response to determining that the configuration file does not specify any particular wallet element, determining that, the usage history does not specify any particular wallet element for the transaction type, and in response to determining that the usage history does not specify any particular wallet element, checking the device-specific information to determine the particular mobile wallet element; and
    sending, to the contactless terminal, wallet element data associated with the particular mobile wallet element.

2. The method of claim 1, wherein determining includes:
    determining, based on the element-selection data and the transaction type, available mobile wallet elements from among a plurality of mobile wallet elements in the mobile wallet;
    displaying the available mobile wallet elements on a user interface of the mobile device; and
    receiving a selection of the particular mobile wallet element from the available mobile wallet elements from a user.

3. The method of claim 1, wherein the determining includes automatically determining the particular mobile wallet element and wherein sending includes automatically sending the wallet element data, without receiving a user selection of the particular wallet element.

4. The method of claim 1, wherein the configuration file designates certain wallet elements to be used with payment transaction types and other wallet elements to be used with non-payment transaction types, and wherein the transaction type is a non-payment transaction type.

5. The method of claim 1, wherein checking the transaction type against the usage history includes determining a percentage amount of time a mobile wallet element is used for the transaction type received from the contactless terminal.

6. The method of claim 1, wherein the device-specific information includes location and time information.

7. The method of claim 1, wherein receiving data from the contactless terminal associated with the transaction type includes receiving the transaction type, the transaction type being one of a payment type or a non-payment.

8. The method of claim 1, wherein receiving data from the contactless terminal associated with a transaction type includes receiving data indicating merchant or product information, the method further including determining the transaction type from the merchant or product information.

9. A non-transitory computer-readable storage medium, the computer-readable storage medium including instructions that when executed by a computer, cause the computer to perform operations of:
    establishing communication between the mobile wallet and a contactless terminal;
    receiving data from the contactless terminal specifying a transaction type, the transaction type indicating a type of wallet mobile element required to process a transaction;
    determining, based on element-selection data and the transaction type, a particular mobile wallet element from among a plurality of mobile wallet elements in the mobile wallet, the element selection data including a configuration file designating certain wallet elements to be used with certain transaction types, a usage history including data associating certain wallet elements with prior transaction types, and device specific-information
    and wherein the determining includes in order of priority, determining that the configuration file does not specify any particular wallet element for the transaction type, and in response to determining that the configuration file does not specify any particular wallet element, determining that, the usage history does not specify any particular wallet element for the transaction type, and in response to determining that the usage history does not specify any particular wallet element, checking the device-specific information to determine the particular mobile wallet element; and
    sending, to the contactless terminal, wallet element data associated with the particular mobile wallet element.

10. The non-transitory computer-readable storage medium of claim 9, wherein operation of determining further includes:
    determining, based on the element-selection data and the transaction type, available mobile wallet elements from among a plurality of mobile wallet elements in the mobile wallet;
    displaying the available mobile wallet elements on a user interface of the mobile device; and
    receiving a selection of the particular mobile wallet element from the available mobile wallet elements from a user.

11. The non-transitory computer-readable storage medium of claim 9, wherein operation of determining further includes automatically determining the particular mobile wallet element and wherein the operation of sending includes automatically sending the wallet element data, without receiving a user selection of the particular wallet element.

12. A system comprising:
    a processor; and
    a memory storing instructions that, when executed by the processor, configure the processor to:
    establish communication between the mobile wallet and a contactless terminal;
    receive data from the contactless terminal associated with a transaction type;
    determine, based on element-selection data and the transaction type, a particular mobile wallet element from among a plurality of mobile wallet elements in the mobile wallet, the element selection data including a configuration file designating certain wallet elements to be used with certain transaction types, a usage history including data associating certain wallet elements with prior transaction types, and device specific-information
    and wherein to determine the particular mobile element a check is made, in order of priority, to determine that the configuration file does not specify any particular wallet element for the transaction type, and in response to determining that the configuration file does not specify any particular wallet element, to determine that, the usage history does not specify any particular wallet element for the transaction type, and in response to determining that the usage history does not specify any particular wallet element, checking the device-specific information to determine the particular mobile wallet element; and
    send, to the contactless terminal, wallet element data associated with the particular mobile wallet element.

13. The system of claim 12, wherein the configuration file designates certain wallet elements to be used with payment transaction types and other wallet elements to be used with non-payment transaction types.

14. The system of claim 12, wherein checking the transaction type against the usage history includes determining a percentage amount of time a mobile wallet element is used for the transaction type received from the contactless terminal.

15. The system of claim 12, wherein the device-specific information includes location and time information.

16. The system of claim 12 wherein receiving data from the contactless terminal associated with the transaction type includes receiving the transaction type, the transaction type being one of a payment type or a non-payment.

17. The system of claim 12 wherein the determining includes automatically selecting the particular mobile wallet element and wherein sending includes automatically sending the wallet element data, without receiving a user selection of the particular wallet element.

* * * * *